United States Patent [19]

Uesugi

[11] 4,153,340

[45] May 8, 1979

[54] CONSTRUCTION OF PARTS PROVIDING FITS

[75] Inventor: Kyozo Uesugi, Osaka, Japan

[73] Assignee: Minolta Camera Kabushiki Kaisha, Osaka, Japan

[21] Appl. No.: 736,021

[22] Filed: Oct. 27, 1976

[30] Foreign Application Priority Data

Nov. 12, 1975 [JP] Japan .................. 50/136573

[51] Int. Cl.² .............................. G02B 7/02
[52] U.S. Cl. ................................ 350/252
[58] Field of Search ............... 350/252, 247, 248, 251, 350/257, 17, 255; 353/100, 101; 354/286; 285/44, 45, 110, 382

[56] References Cited

U.S. PATENT DOCUMENTS

| | | | |
|---|---|---|---|
| 2,722,158 | 11/1955 | Goldberg | 353/100 |
| 3,521,913 | 7/1970 | Veruhein et al. | 285/110 |
| 3,602,531 | 8/1971 | Patry | 285/382 |
| 3,749,479 | 7/1973 | Kempf | 350/252 |
| 3,763,543 | 10/1973 | Strauch et al. | 350/252 |
| 3,828,991 | 8/1974 | Moore | 350/252 |
| 3,888,568 | 6/1975 | Norris et al. | 350/252 |
| 3,971,577 | 7/1976 | Schemith | 285/382 |

*Primary Examiner*—John K. Corbin
*Assistant Examiner*—B. Wm. delos Reyes
*Attorney, Agent, or Firm*—Wolder, Gross & Yavner

[57] ABSTRACT

An assembly includes a male member fitted in the bore of a female member in a rigid or slidable manner, with at least one of the confronting peripheral surfaces of both members being formed with a plurality of equally spaced projections which are positioned between the two members. These projections are of such a shape as to afford a low mechanical strength, such as for instance, triangular or trapezoidal in cross section, and contribute to eliminating any looseness in the fit between the assembled members. The projections may be cut or collapsed or otherwise altered under pressure by a face of the opposite member in which the projection carrying member is fitted during assembly thereby eliminating any clearance between the members with the resulting obviation of looseness.

19 Claims, 9 Drawing Figures

Fig.8.
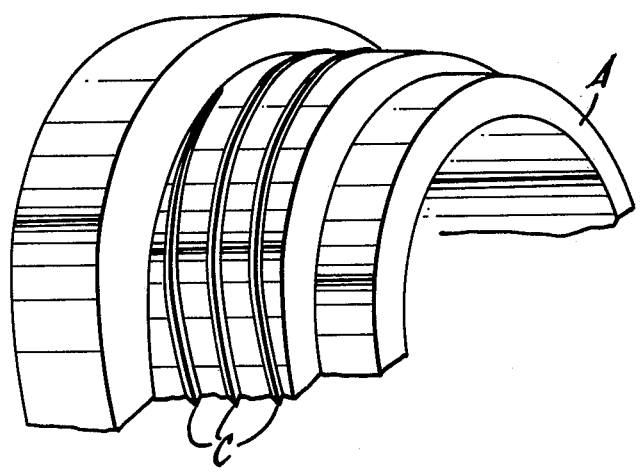
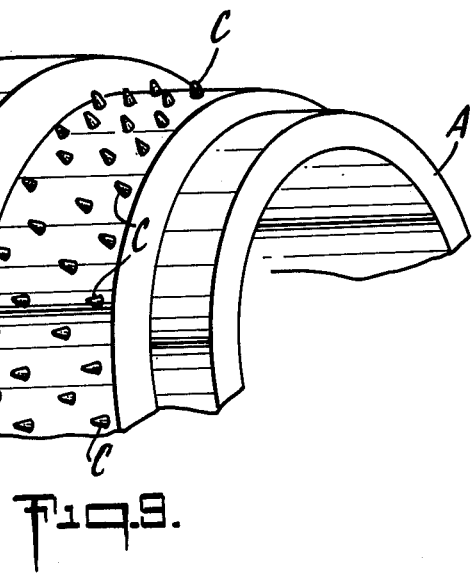
Fig.9.

CONSTRUCTION OF PARTS PROVIDING FITS

BACKGROUND OF THE INVENTION

The present invention relates generally to an improved construction coupling member in cameras or other types of devices, and it relates more particularly to the assembly of a pair of parts which interfit in a rigid or slidable manner.

A conventional procedure for eliminating looseness between a pair of interfitting members is know as an interference fit. However, in accordance with the interference fit, an excess of material on the peripheral surface of a first member must be ground or pressed and thereby broken by the wall of another or second member in which the aforesaid first member is fitted, thereby necessitating an expenditure of much time and effort in assembly, and hence lowering in operation efficiency. In addition, in case the aforesaid interference is unreasonably large, then there results strains in the both members, when one member is fitted into another. Still further, the interference fit finds its application only in providing rigid fits, and thus fails to provide a sliding fit between the both members.

For this reason, for high-precision parts for use in a camera, which should avoid strains of the above type, the aforesaid interference fit is unsuitable, but a clearance fit is applicable in which one member is fitted into another with a minimum of clearance. In the meantime, it is well known that a transitional fit which is expected to provide precise fit between a male member and a female member when both members are assembled with each other. However, this transitional fit is not a suitable solution to the aforesaid problem because not only a clearance but also an interference may occur between both members as the case may be. The reason why the aforesaid clearance fit is unsuitable is that even if the diameter of a hole in one member and the outer diameter of another member fitted therein are manufactured to the same diameter, there necessarily occurs dimensional errors in the finished parts thus providing a possibility of causing an interference fit. In such a case, however, a tolerance is provided for the dimensions of the respective members in the design stage so as to provide a desired clearance between the two members. However, the provision of such a tolerance leads to an eccentricity between the assembled parts, if the resulting clearance is too large, and such an eccentricity cannot be neglected. In other words, the aforesaid eccentricity exerts an adverse effect on the performance and quality of the devices beyond their allowable limits. This is particularly true in the case of a lens barrel for use in an optical system of a camera, because such clearance fit having unexpected large clearance would result in misalignment of the optical axes of the respective lenses. For this reason, a clearance between the two interfit parts should be minimized, and then the tolerances for the parts should be strictly controlled although there arises an increase in manufacturing costs of parts. Even if an error or deviation in clearance beyond the specified limits is of no consequence for a particular interfit pair of parts, an accumulation of errors of this kind, such as in the case of a lens barrel which includes a plurality of such fits, would lead to an extreme lowering in the performance of the optical system of a camera.

FIG. 1 of the drawing herein shows a plurality of fits incorporated in a lens barrel of a camera. The fits shown at 1 and 15 are classified as follows:

| Rigid Fit | Normal Slidable Fit | Smoothly Slidable Fit |
|---|---|---|
| 1 2 3 4 | 13 | 7 |
| 5 6 8 9 | | |
| 10 11 12 | | |
| 14 15 | | |

As can be seen from the above, the lens barrel and the like in a camera includes a plurality of fits of the subject type. Accordingly, even if the looseness in one fit may be negligible, accumulation of such looseness in a plurality of fits can be by no means neglected. For this reason, dimensional accuracy of the respective parts should be strictly controlled. This is a particularly critical problem in the case of a lens barrel having a further complicated construction or devices including a plurality of fits of this type.

Definitions of the terms appearing in the above Table are as follows: By a rigid fit is meant a fit in which one member is rigidly fitted another by using small-sized screws and the like; by a normal slidable fit is meant a fit in which one member fitted in another may be relatively slidable, when an external force strong enougth to move one member is applied thereto; and by a smoothly slidable fit is meant a fit between high-speed operating portions associated with an automatic diaphragm operation.

SUMMARY OF THE INVENTION

It is an object of the present invention to provide an assembly of interfitting parts or members such that one member is fitted in another, with a clearance left therebetween but without any looseness or relative eccentricity.

It is another object of the present invention to provide an assembly of interfitting parts or members which may require less strict control for the dimensions of the finished parts in comparison with the conventional parts or members of corresponding assemblies without sacrificing any accuracy of the assembled condition of the parts which are less expensive.

It is a further object of the present invention to provide an assembly of interfitting parts or members such that one member is fitted in another with a given clearance left therebetween without relative looseness or eccentricity accruing from the aforesaid clearance in the same manner as in an interference fit, with greater ease, as compared with the interference fit, but without strains in the parts or members when assembled.

The above and other objects of the present invention will become apparent from a reading of the following description taken in conjunction with the accompanying drawings which illustrate preferred embodiments thereof.

BRIEF DESCRIPTION OF THE DRAWINGS

FIGS. 7 to 9 are perspective views of further embodiments of the present invention.

DESCRIPTION OF THE PREFERRED EMBODIMENT

Figure 1:
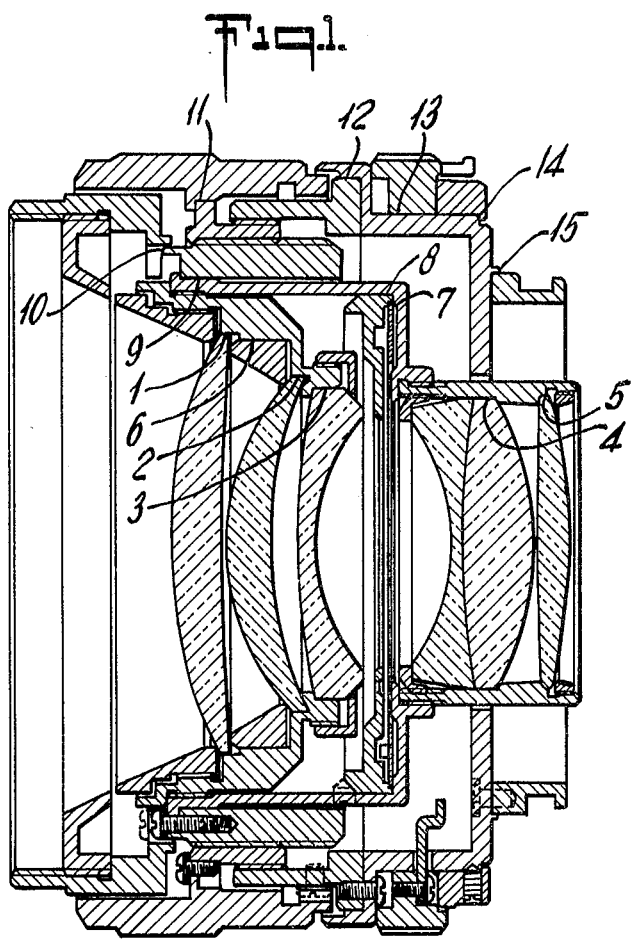
FIG. 1 is a medial longitudinal cross-sectional view of a lens barrel for use in a camera, showing various types of known fits, as an example.
Figure 2:
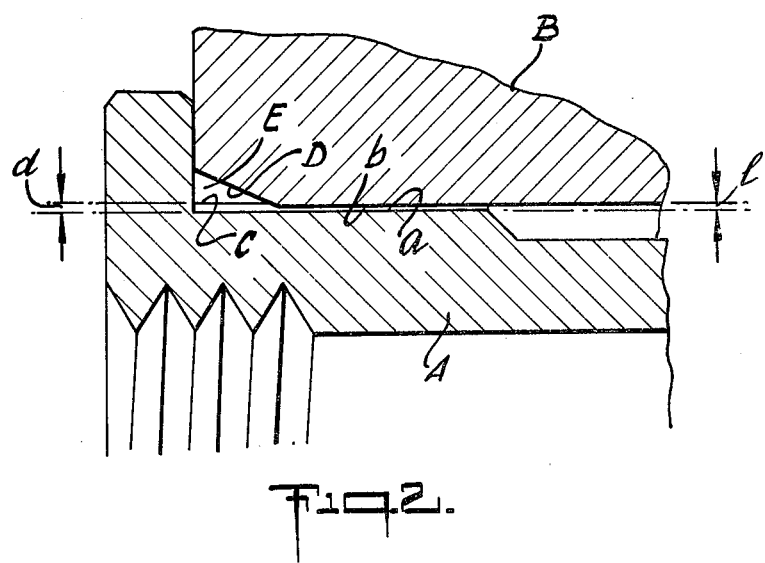
FIG. 2 is a fragmented longitudinal sectional view of one embodiment of the present invention, showing the assembled condition thereof.
Figure 3:
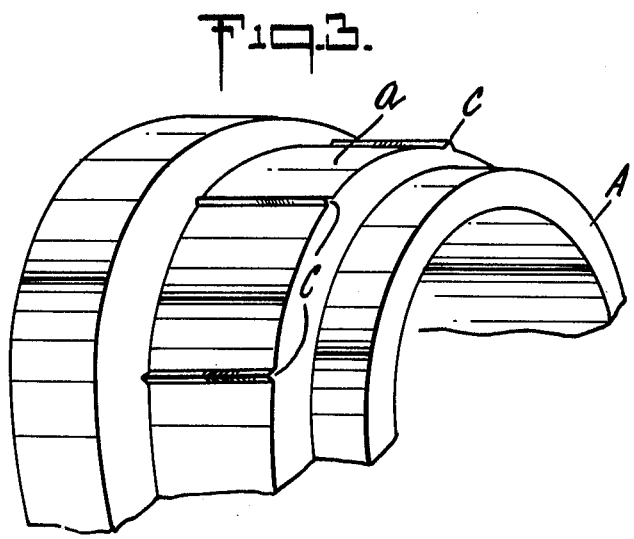
FIG. 3 is a perspective view of an essential part of the embodiment of FIG. 2.

Referring now to the drawings, more particularly FIGS. 2 and 3 thereof which are enlarged views of essential parts of a lens barrel for use in a camera, the reference letter A generally designates a lens retaining frame for retaining a lens (not shown) and is made of a synthetic resin such as ABS resin, POM resin, PBT resin, or a metal such as a copper alloy, aluminum alloy or the like. These materials posess a resiliency and plasticity large enough for retaining the rigidity of lens-barrel components for use in a camera. The lens retaining frame A is fitted in an operating member B made of a material equivalent to the aforesaid materials, or other suitable material. The operating member B is accessible from the exterior for operation, and transmits the movement thereof to the lens retaining frame A through the intermediary of a known motion translating means such as a pin-slot coupling, thereby providing a predetermined movement to the lens retaining frame A. A dimension or diameter of an outer circular cylindrical portion a (a peripheral surface) of the lens retaining frame A is smaller than that of a preferrably smooth surface portion b (the face or surface of a bore or hole) of the operating member B, thereby providing a predetermined clearance therebetween when both members are assembled. A plurality of projecting portions or projections c are formed on the peripheral surface or portion a at an equal circumferential spacing, the aforesaid projecting portions c extending as ridges in the axial direction of the lens retaining frame A. The projecting portion c are made of a material or into a shape which presents a low mechanical strength less than that presented by member B proximate surface b. For instance, the projecting portions c may be of a triangular or trapezoidal cross-section, so that when an external force is applied to the apex of a projecting portion, the apex portion may be cut or collapsed or otherwise deformed with ease. The operating member B is formed with an inwardly tapered portion D for facilitating the insertion of the lens retaining frame A into a bore in the operating member B.

In this respect, the height d of the projecting portions c is smaller or greater in dimension than a uniform clearance l provided between the face a of the lens retaining frame A and the face b of the operating member B, as required, the member A being fitted in the member B. The operating member B is provided with a cutting-chip trap E for trapping chips so as not to deposit between the portions or surfaces a and b of the members A and B when the projecting portions c are forced into the bore in the operating member B. With the aforesaid arrangement, in case the height d of the projecting portions c is smaller in dimension than the clearance l, then the lens retaining member A may be smoothly fitted in the bore in the operating member B, with the projecting portions c being free of contact with the portion b, i.e., the wall or face of the aforesaid bore, so that the projecting portions c may be positioned within the contour or space of the clearance. The provision of the projecting portions c may reduce the amount of looseness between the member A and the member B. In addition, eccentricity of the lens retaining member A relative to the operating member B may be avoided, because the lens retaining member A may be held, with its axis being in substantial alignment with that of the operating member B, by means of the projecting portions c formed on the periphery of the lens retaining member A at an equal circumferential spacing.

In the case the height d of the projecting portions c on the lens retaining frame A is greater in dimension than the clearance l, when the lens retaining frame A is fitted in the bore in the operating member B, the lens retaining frame A is guided by the tapered portion D formed at the entrance of the bore in the operating member B so as to be smoothly fitted therein. In this case, the projecting portions c on the lens retaining frame A are cut or collapsed by means of the edge of a bore in the operating member B, in as much as the projecting portions c possess a mechanical strength sufficiently lower than the member B proximate face b therefor. As a result, the lens retaning frame A may be fitted in the operating member B without a large force but with ease, so that the projecting portions c may be positioned within the contour or space of the clearance between the peripheral faces a and b thereby completely obviating any looseness between the members' A and B. In addition, the portion b or the bore of the operating member B need not necessarily be a true circle in cross-section but an ellipse. In this case, even if the lens retaining frame A is inserted into the operating member B in a biased relation, a force is directed towards the axis of the operating member due to the projections c, more particularly a greater force is applied thereto from the biased side of the lens retaining frame A. As a result, the lens retaining frame A is automatically brought into axial alignment with the operating member B, thus precluding a possibility of the lens retaining frame A being positioned within the operating member in a biased relation.

Figure 4:
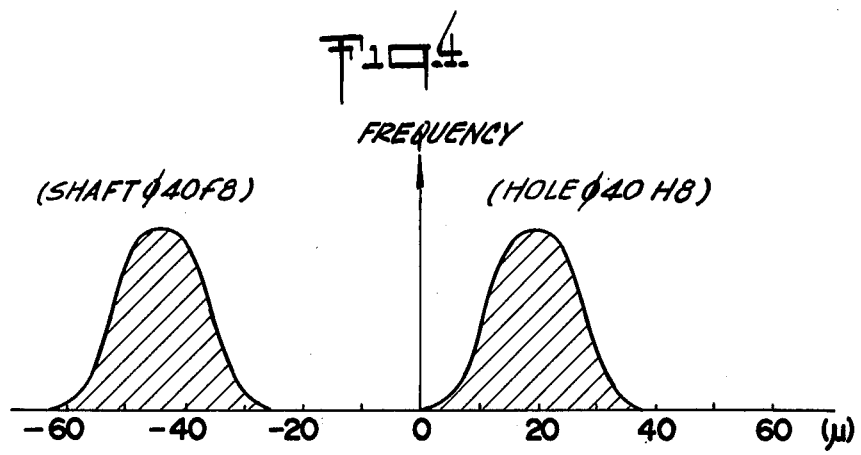
FIG. 4 is a frequency distribution diagram showing the tolerances for actual sizes or dimensions relative to the basic sizes or dimensions of a shaft and a hole.
Figure 5:
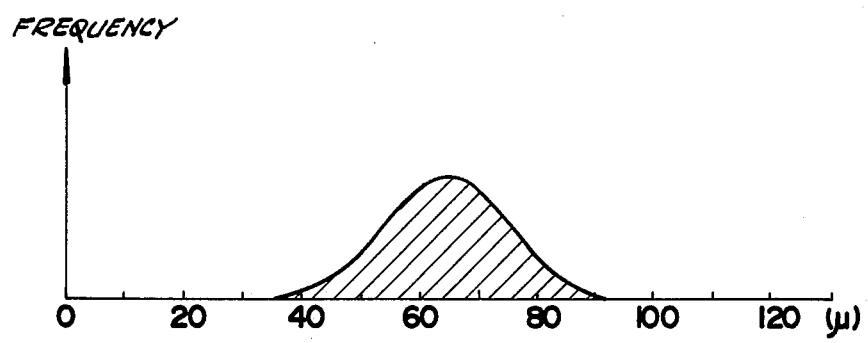
FIG. 5 is a frequency distribution diagram for clearances provided between the both members, when the shaft of FIG. 4 is fitted in the hole of FIG. 4.

FIG. 4 shows the dimensional errors (so-called tolerances) of the actual dimensions or sizes relative to the basic dimensions or sizes of the interfitting section of members A and B. In these diagrams, a basic size or dimension of 40 mm is given to the diameters of both the shaft and the hole or bore. FIG. 4 shows normal frequency distributions of the actual dimensions of the respective members within the tolerances of f8 for the shaft $$(\phi 40 f8 \begin{array}{c} -0.025 \\ -0.064 \text{mm}, \end{array}$$

i.e., 39.936 to 39.975 mm) and H8 for the bore $$(\phi 40 H8 \begin{array}{c} +0.039 \text{mm}, \\ 0 \end{array}$$

i.e., 40 to 40.039 mm) according to the Japanese Industrial Standard (which corresponds to the International Organization for Standardization). The differences between the diameters of the bore and those of the shaft, when the both members are assemblied, i.e., the looseness therebetween is considered to give a frequency distribution as shown in FIG. 5, when the aforesaid assembly of the shaft and bore is effected according to the prior art as illustrated in FIG. 4.

Figure 6:
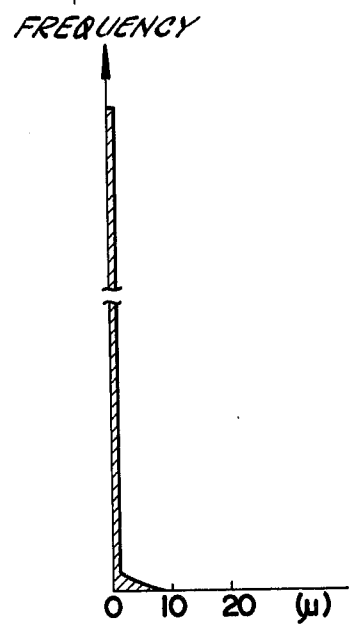
FIG. 6 is a frequency distribution diagram for clearances provided between a male member and a female member, in which the aforesaid male member is fitted, according to the present invention.

In contrast thereto, when the shaft and bore are assembled according to the present invention and the height d of the aforesaid projecting portions c is set to a dimension of ½ to 1½ of the maximum clearance (in the preceding embodiment, 0.026 to 0.077 mm), then the looseness between the shaft and the bore will be as shown in FIG. 6, showing that looseness is eliminated or minimized. Meanwhile, the above numerical values of the height d of the projecting portions c, i.e., ½ to 1½, are shown as examples of the heights which are greater and smaller than the maximum clearance l. Accordingly, the height d of the projecting portions c should preferably be set to the range given above. However, the above range may be suitably varied according to the type of material used and to the desired allowable extent of looseness, as required. Thus, the above numerical values should not be construed in a limitative sense.

The aforesaid projecting portions c may be molded jointly with the molding of the lens retaining frame A which is made of a synthetic resin, presenting no problem in the aspect of manufacture but an advantage of a low manufacturing cost.

Figure 7:
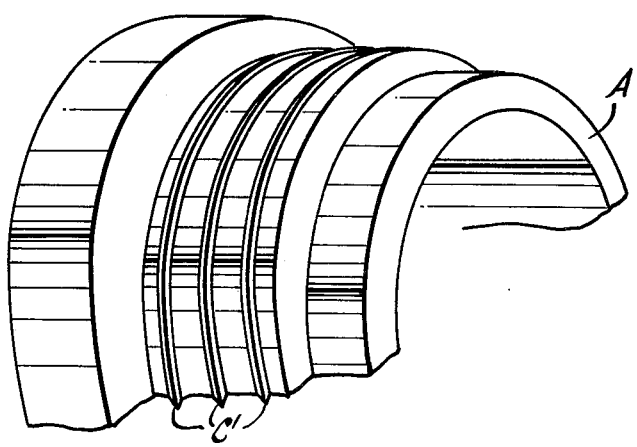

As shown in FIG. 7, the projecting portions c' may be provided in the form of projections extending in the circumferential direction or in a helical form as a helical ridge c'' as shown in FIG. 8, rather than in the axial direction of the lens retaining frame A. In addition, any projecting portions may be used, so long as they are arranged on the peripheral face a of the lens retaining frame A at an equal circumferential spacing between each other, and thus minute projections c''' of a conical form as shown in FIG. 9 may be employed in place of a continuous linear run of projecting portions as shown in the preceding embodiments.

While a description has been provided of a lens barrel for use in a camera for the convenience of explanation, the structures of the present invention should be by no means limited to such an example, and thus may be varied or altered as required. Thus, the structure of the present invention is not limited to the interfitting parts or members being of circular cross-section, but to parts having various shapes of cross-sections, such as a rectangle or the like.

I claim:

1. An interfitting parts assembly comprising:
   a female member having a bore with a first continuous peripheral face;
   a male member fitted in said bore with a clearance fit and having a second continuous peripheral face confronting and spaced from said first continuous peripheral face to delineate a clearance equally around the face of the male member;
   a plurality of equally circumferentially spaced projecting portions, the heights of which do not exceed one and one half the maximum of said clearance between said first and second faces formed on one of said faces and having a mechanical strength lower than that of said members, whereby said clearance is at least reduced with the interfitting of said members;
   the height of said projecting portions being greater in dimension than the minimum clearance between said first and second faces;
   a portion of one of said members at an initial engaging end being formed with a tapered portion for facilitating the assembly of said members whereby there is provided a cavity delineated by said tapered portion for trapping cutting-chips of said projecting portions therein attendant to the assembly of said members;
   said projecting portions being in the form of linear ridges parallel with the longitudinal direction of said male member.

2. An interfitting parts assembly comprising:
   a female member having a bore with a first continuous peripheral face;
   a male member fitted in said bore with a clearance fit and having a second continuous peripheral face confronting and spaced from said first continuous peripheral face to delineate a clearance equally around the face of the male member;
   a plurality of equally circumferentially spaced projecting portions, the heights of which do not exceed one and one half the maximum of said clearance between said first and second faces formed on one of said faces and having a mechanical strength lower than that of said members, whereby said clearance is at least reduced with the interfitting of said members;
   the height of said projecting portions being greater in dimension than the minimum clearance between said first and second faces;
   a portion of one of said members at an initial engaging end being formed with a tapered portion for facilitating the assembly of said members whereby there is provided a cavity delineated by said tapered portion for trapping cutting-chips of said projecting portions therein attendant to the assembly of said members;
   said projecting portions being in the form of annular ridges coaxial with the longitudinal axis of said male member.

3. An interfitting parts assembly comprising:
   a female member having a bore with a first continuous peripheral face;
   a male member fitted in said bore with a clearance fit and having a second continuous peripheral face confronting and spaced from said first continuous peripheral face to delineate a clearance equally around the face of the male member;
   a plurality of equally circumferentially spaced projecting portions, the heights of which do not exceed one and one half the maximum of said clearance between said first and second faces formed on one of said faces and having a mechanical strength lower than that of said members, whereby said clearance is at least reduced with the interfitting of said members;
   the height of said projecting portions being greater in dimension than the minimum clearance between said first and second faces;
   a portion of one of said members at an initial engaging end being formed with a tapered portion for facilitating the assembly of said members whereby there is provided a cavity delineated by said tapered portion for trapping cutting-chips of said projecting portions therein attendant to the assembly of said members;
   said projecting portions comprising a helical ridge coaxial with the longitudinal axis of said male member.

4. An interfitting parts assembly comprising:
   a female member having a bore with a first continuous peripheral face;

a male member fitted in said bore with a clearance fit and having a second continuous peripheral face confronting and spaced from said first continuous peripheral face to delineate a clearance equally around the face of the male member;

a plurality of equally circumferentially spaced projecting portions, the heights of which do not exceed one and one half the maximum of said clearance between said first and second faces formed on one of said faces and having a mechanical strength lower than that of said members, whereby said clearance is at least reduced with the interfitting of said members;

the height of said projecting portions being greater in dimension than the minimum clearance between said first and second faces;

a portion of one of said members at an initial engaging end being formed with a tapered portion for facilitating the assembly of said members whereby there is provided a cavity delineated by said tapered portion for trapping cutting-chips of said projecting portions therein attendant to the assembly of said members;

said projecting portions being initially in the form of a plurality of projections of conical shape.

5. An interfitting parts preassembly for a camera comprising:
a female member having a bore therein with a first continuous peripheral face;
a male member having a section thereof at least partially insertable in said bore and having an outer second continuous peripheral face confronting and spaced from said first peripheral face when said male member section registers with said bore to delineate a clearance space; and
circumferentially spaced projections disposed on one of said peripheral faces and extending toward the other of said peripheral faces and having a mechanical strength lower than that of said member having said other peripheral face so as to be permanently deformed as said projections engage said member having said other peripheral face upon insertion of said male member section into said bore and said projections having the same height which is greater than 0.5 times and not exceeding 1.5 times the maximum width of said clearance space.

6. The preassembly of claim 5 wherein the height of said projections is greater than the width of said clearance space.

7. The preassembly of claim 5 wherein said bore is inwardly tapered at an end thereof.

8. The preassembly of claim 5 wherein said bore and said male member insertable sections are of substantially circular transverse cross-section.

9. The preassembly of claim 8 wherein said projections comprise equally circumferentially spaced longitudinally extending ridges.

10. The preassembly of claim 8 wherein said projections comprise longitudinally spaced circumferentially extending ridges.

11. The preassembly of claim 8 wherein said projections comprise a longitudinally helically extending ridge.

12. The preassembly of claim 8 wherein said projections comprise regularly spaced conical protuberances.

13. An interfitting parts assembly for a camera comprising:
a female member having a bore therein with a first continuous peripheral face;
a male member having a section thereof at least partially insertable in said bore and having an outer second continuous peripheral face confronting and spaced from said first continuous peripheral face when said male member section registers with said bore to delineate a clearance space equally around said second face;
circumferentially spaced projections, the heights of which do not exceed one and one half the maximum of said clearance between said first and second faces disposed on one of said faces of one of said members and having a mechanical strength lower than that of the other of said members, so as to be permanently deformed when said projections engage said other member upon insertion of said male member section into said bore, whereby said clearance is at least reduced with interfitting of said members; and
a tapered portion formed at an initial engaging end of said other member and being free of said, projections for facilitating the assembly of said members.

14. The assembly of claim 13 wherein the height of said projections is greater in dimension than the minimum clearance between said first and second faces.

15. The assembly of claim 14 further comprising a wall portion provided on one of said members which has said projections, said wall portion engageable with the initial engaging end of another one of said members and cooperative with said tapered portion to delineate a cavity for trapping debris from the projections therein, upon the male member being assembled with the female member.

16. The assembly of claim 15 wherein said projections are in the form of linear parallel ridges parallel with the longitudinal direction of said male member.

17. The assembly of claim 15 wherein said projections are in the form of annular ridges coaxial with the longitudinal axis of said male member.

18. The assembly of claim 15 wherein said projecting portions comprise a helical ridge coaxial with the longitudinal axis of said male member.

19. The assembly of claim 15 wherein said projections are initially in the form of a plurality of projections of conical shape.

* * * * *